(12) United States Patent  (10) Patent No.: US 7,812,640 B2
Sherman  (45) Date of Patent:  Oct. 12, 2010

(54) BRIDGE DESIGN FOR SD AND MMC DATA BUSES

(75) Inventor: Itay Sherman, Hod Hasharon (IL)

(73) Assignee: Modu Ltd., Kfar Saba (IL)

( * ) Notice: Subject to any disclaimer, the term of this patent is extended or adjusted under 35 U.S.C. 154(b) by 0 days.

(21) Appl. No.: 12/534,413

(22) Filed: Aug. 3, 2009

(65) Prior Publication Data

US 2009/0289662 A1    Nov. 26, 2009

Related U.S. Application Data

(63) Continuation-in-part of application No. 12/008,501, filed on Jan. 11, 2008, now Pat. No. 7,574,549.

(51) Int. Cl.
*H03K 19/0175* (2006.01)
(52) U.S. Cl. ............... 326/86; 326/82; 326/90; 375/219; 375/220
(58) Field of Classification Search ............ 326/86, 326/56–59, 82, 83, 90; 375/219, 220
See application file for complete search history.

(56) References Cited

U.S. PATENT DOCUMENTS

| | | | |
|---|---|---|---|
| 3,832,489 A * | 8/1974 | Krishna | ............... 178/71.1 |
| 5,625,673 A | 4/1997 | Grewe et al. | |
| 5,628,055 A | 5/1997 | Stein | |
| 5,790,526 A | 8/1998 | Kniess et al. | |
| 5,809,115 A | 9/1998 | Inkinen | |
| 5,893,037 A | 4/1999 | Reele et al. | |
| 5,907,815 A | 5/1999 | Grimm et al. | |
| 6,188,917 B1 | 2/2001 | Laureanti | |
| 6,201,867 B1 | 3/2001 | Koike | |
| 6,243,578 B1 | 6/2001 | Koike | |
| 6,477,357 B1 | 11/2002 | Cook | |
| 6,516,202 B1 | 2/2003 | Hawkins et al. | |
| 6,617,871 B2 | 9/2003 | Stark | |
| 6,640,113 B1 | 10/2003 | Shim et al. | |
| 6,690,947 B1 | 2/2004 | Tom | |

(Continued)

FOREIGN PATENT DOCUMENTS

EP    1871075 A1    12/2007

(Continued)

*Primary Examiner*—Vibol Tan
(74) *Attorney, Agent, or Firm*—Soquel Group, LLC

(57) ABSTRACT

A circuit with bi-directional signal transmission, including a first signal source, for generating a first signal comprising one bit per clock cycle during a first plurality of clock cycles, a second signal source, for generating a second signal including one bit per clock cycle during a second plurality of clock cycles, a first buffer, coupled with the first signal source, that outputs the first signal when the first buffer is enabled, a second buffer, coupled with the second signal source, that outputs the second signal when the second buffer is enabled, and a plurality of logical gates, coupled with the first signal source, the second signal source, the first buffer and the second buffer, that control enablement of the first buffer and the second buffer, such that (i) at any given clock cycle at least one of the first buffer and the second buffer is disabled, and (ii) when the first buffer and said the buffer are both disabled, subsequent generation of a '0' bit in the first signal or the second signal causes enablement of the first buffer or the second buffer, respectively.

12 Claims, 6 Drawing Sheets

U.S. PATENT DOCUMENTS

| | | | |
|---|---|---|---|
| 6,806,737 B2 | 10/2004 | Sung et al. |
| 6,898,283 B2 | 5/2005 | Wycherley et al. |
| 6,900,664 B2 | 5/2005 | Wu |
| 6,907,264 B1 | 6/2005 | Sterkel |
| 6,999,792 B2 | 2/2006 | Warren |
| 7,085,542 B2 | 8/2006 | Dietrich et al. |
| 7,194,285 B2 | 3/2007 | Tom |
| 7,266,391 B2 | 9/2007 | Warren |
| 7,266,463 B2 | 9/2007 | Dixon et al. |
| 7,292,067 B2 * | 11/2007 | Schwarz | 326/82 |
| 7,512,671 B1 | 3/2009 | Gladwin et al. |
| 7,692,450 B2 * | 4/2010 | Aranovsky | 326/82 |
| 7,737,727 B2 * | 6/2010 | Aranovsky | 326/83 |
| 2002/0090980 A1 | 7/2002 | Wilcox et al. |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0070225 A1 | 3/2005 | Lee |
| 2005/0159184 A1 | 7/2005 | Kerner et al. |
| 2006/0003804 A1 | 1/2006 | Liu |
| 2006/0105722 A1 | 5/2006 | Kumar |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0266182 A1 | 11/2007 | Lanning |
| 2007/0266183 A1 | 11/2007 | Lanning |
| 2007/0288583 A1 | 12/2007 | Rensin et al. |
| 2008/0009325 A1 | 1/2008 | Zinn et al. |
| 2008/0026794 A1 | 1/2008 | Warren |
| 2008/0040354 A1 | 2/2008 | Ray et al. |
| 2008/0140886 A1 | 6/2008 | Izutsu |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

| A | x | 0 | 0 | 1 | 1 | 0 | 1 | 1 | 1 | 0 | 1 | 1 | 1 | 1 | x | x | x | x | x | x |
|---|---|---|---|---|---|---|---|---|---|---|---|---|---|---|---|---|---|---|---|---|
| Logic A (DFF_EnAB.in) | 0 | 0 | 1 | 1 | 1 | 1 | 1 | 1 | 1 | 1 | 0 | 0 | 0 | 0 | 0 | 0 | 0 | 0 | 0 | 0 |
| DFF_EnAB.out | | 0 | 0 | 1 | 0 | 0 | 1 | 1 | 1 | 1 | 1 | 0 | 0 | 0 | 0 | 0 | 0 | 0 | 0 | 0 |
| Out A (BufferAtoB.out) | x | x | x | 0 | 1 | 0 | 1 | 0 | 0 | 1 | 0 | x | x | x | x | x | x | x | x | x |
| B | x | x | x | x | x | x | x | x | x | x | x | 1 | 0 | 0 | 0 | 1 | 0 | 0 | 1 | 1 |
| Logic B (DFF_EnBA.in) | 0 | 0 | 0 | 0 | 0 | 0 | 0 | 0 | 0 | 0 | 0 | 0 | 0 | 0 | 0 | 1 | 1 | 1 | 1 | 1 |
| DFF_EnBA.out | 0 | 0 | 0 | 0 | 0 | 0 | 0 | 0 | 0 | 0 | 0 | 0 | 0 | 0 | 0 | 0 | 1 | 1 | 1 | 1 |
| Out B (BufferBtoA.out) | x | x | x | x | x | x | x | x | x | x | x | x | x | x | x | 0 | 1 | 0 | 1 | 1 |

Sample A and B Signals for SSD/MMC Bridge Logic

FIG. 5

BRIDGE DESIGN FOR SD AND MMC DATA BUSES

CROSS REFERENCES TO RELATED APPLICATIONS

This application is a continuation-in-part of assignee's application U.S. Ser. No. 12/008,501, now U.S. Pat. No. 7,574,549, filed on Jan. 11, 2008, entitled BRIDGE DESIGN FOR SD AND MMC DATA BUSES.

FIELD OF THE INVENTION

The field of the present invention is bi-directional electrical data signal lines.

BACKGROUND OF THE INVENTION

The SD card and multi-media card (MMC) standards use bi-directional bus lines. Specifically, the four data lines D0-D3 and the CMD lines are bi-directional, and the CLK line for a clock is uni-directional.

Conventionally, signal direction cannot be resolved by monitoring a simple condition. Instead, signal direction is determined by content of bus transactions; i.e., content of messages transferred over a bus.

The SD card and MMC standards also define voltage levels for signals. An SD card, for example, should operate in the 2.7V-3.6V range.

Some advanced silicon processes do not support voltages higher than 1.8V. For such processes, support of SD and MMC requires use of external level shifters, which boost voltages at a terminal. For a bi-directional bus connecting terminals A and B, a level shifter drives terminal A to 3V when terminal B is at 1.8V, for enabling a data signal to travel from A to B. Similarly, a level shifter drives terminal B to 3V when terminal A is at 1.8V, for enabling a data signal to travel from B to A. Thus level shifters require knowledge of signal direction in order to operate properly.

Conventional implementations of level shifting include an additional pin for each bus signal, to determine signal direction. Such an implementation is present in the Level Translator, Model SN74AVCA406 SMC/xD, manufactured and distributed by Texas Instruments, Inc. of Dallas, Tex. Integrated circuits that interface with such level shifters must support directional signals, in addition to the standard SD and MMC signals.

Support of directional signals causes large overhead and cost, for both the level shifter and the integrated circuit that interfaces with it. This is one of the drawbacks of bi-directional data buses.

Devices that require bridges between SD devices, such as a bridge between an SD host and an SD slave, also encounter the problem of determining signal direction. Moreover, often the SD signals being bridged do not have directional signals associated therewith, and thus their direction is unknown.

It would thus be of advantage to have circuitry and logic for determining signal direction in a bi-directional SD or MMC bus, without requiring external direction signals and without requiring decoding of exact content of bus transactions.

SUMMARY OF THE DESCRIPTION

Aspects of the present invention relate to circuitry for bi-directional SD and MMC buses, which overcomes drawbacks of conventional circuitry by determining bus direction without use of external directions signals, and without decoding exact content of bus transactions. Further aspects of the present invention relate to a SIM interface, to monitor bus direction between a SIM card and a controller.

In one embodiment, the present invention employs two data buffers, a first buffer that drives signals in a data bus in a direction from a terminal A to a terminal B, and a second buffer that drives signals in the opposite direction. The buffers may be in an enabled or disabled state. When a buffer is enabled, it drives the signal direction.

Special logic is introduced to determine when to enable and disable each of the buffers, based on logical processing of sampled bits at terminals A and B.

There is thus provided in accordance with an embodiment of the present invention a circuit with bi-directional signal transmission, including a first signal source, for generating a first signal comprising one bit per clock cycle during a first plurality of clock cycles, a second signal source, for generating a second signal including one bit per clock cycle during a second plurality of clock cycles, a first buffer, coupled with the first signal source, that outputs the first signal when the first buffer is enabled, a second buffer, coupled with the second signal source, that outputs the second signal when the second buffer is enabled, and a plurality of logical gates, coupled with the first signal source, the second signal source, the first buffer and the second buffer, that control enablement of the first buffer and the second buffer, such that (i) at any given clock cycle at least one of the first buffer and the second buffer is disabled, and (ii) when the first buffer and said the buffer are both disabled, subsequent generation of a '0' bit in the first signal or the second signal causes enablement of the first buffer or the second buffer, respectively.

There is additionally provided in accordance with an embodiment of the present invention a circuit with bi-directional signal transmission, including a first signal source, for generating a first signal including one bit per clock cycle during a first plurality of clock cycles, a second signal source, for generating a second signal including one bit per clock cycle during a second plurality of clock cycles, a first buffer, coupled with the first signal source, that outputs the first signal when the first buffer is enabled, a second buffer, coupled with the second signal source, that outputs the second signal when the second buffer is enabled, a plurality of logical gates, coupled with the first signal source, the second signal source, the first buffer and the second buffer, that control enablement of the first buffer and the second buffer, such that there is less than a one clock cycle delay in transmitting the first signal via the first buffer during the first plurality of clock cycles, and in transmitting the second signal via the second buffer during the second plurality of clock cycles.

BRIEF DESCRIPTION OF THE DRAWINGS

The present invention will be more fully understood and appreciated from the following detailed description, taken in conjunction with the drawings in which:

FIG. 5 is a sample simulation of the method of FIG. 3, in accordance with an embodiment of the present invention.

DETAILED DESCRIPTION

Aspects of the present invention relate to a bi-directional data bus that connects a terminal A with a terminal B. The data bus may be an SD or MMC bridge, wherein terminal A is generally connected to a host device and terminal B is connected to a slave device. Unlike conventional SD and MMC bridges, the bridges of the present invention are capable of determining signal direction without the need for external directional signals, and without the need for decoding exact content of messages being transmitted over the bridge.

Figure 1:
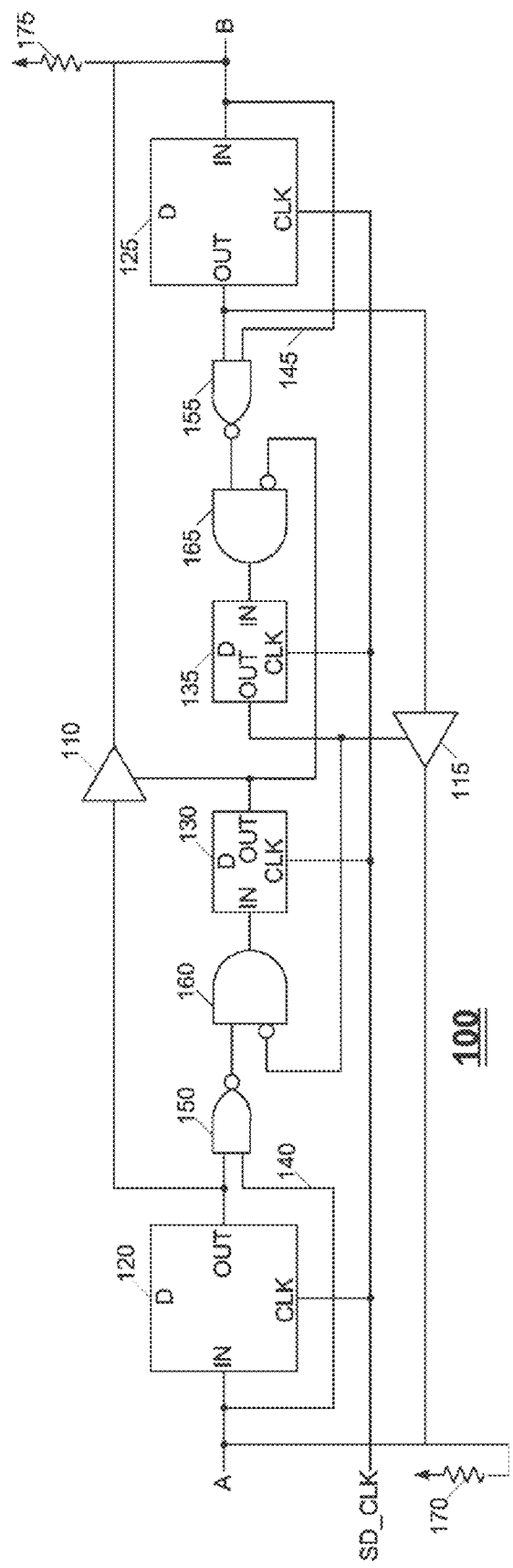
FIG. 1 is a simplified diagram of an electrical circuit that determines bus direction in bi-directional SD and MMC signal lines, in accordance with a first embodiment of the present invention.

Reference is made to FIG. 1, which is a simplified diagram of an electrical circuit 100 that determines bus direction in bi-directional SD and MMC signal lines, in accordance with an embodiment of the present invention. Circuit 100 connects two terminals, A and B, and carries signals in both directions; i.e., from A to B, and from B to A.

Generally, one terminal connects to an SD host and the other terminal connects to an SD slave. In such case, there are multiple bi-directional data lines D0-D3 and CMD. The data lines D0-D3 are synchronized so that they change their signal directions simultaneously.

The voltages at terminals A and B may be the same, or may be different. To accommodate different voltages at the terminals, circuit 100 includes two level-shifter buffers, 110 and 115, which drive signals from A to B and from B to A, respectively. Level shifting generates voltage drops across the buffers in order to drive the signal direction. Each buffer may enabled or disabled. When buffer 110 is enabled, signal data is transmitted from A to B, and when buffer 115 is enabled, signal data is transmitted from B to A. Buffers 110 and 115 are tri-state buffers, which hold their outputs at high impedance when disabled, and block transfer of signal data. Tri-state buffers thus have three outputs; namely, '0', '1' and 'Z'.

Circuit 100 also includes four data flip flop (DFF) modules; namely, module 120 designated DFF_A, module 125 designated DFF_B, module 130 designated DFF_EnAB, and module 135 designated DFF_EnBA. Each DFF module has an input value, an output value and a clock value. Each DFF module delays the input by one clock count; i.e., the DFF module captures the input signal at the moment of a rising clock edge, when the clock goes high, and subsequent input changes do not influence the output until the next rising clock edge.

Modules 130 and 135 are used to enable buffers 110 and 115, respectively. Specifically, when DFF_EnAB.out=0, buffer 110 is enabled, and when DFF_EnAB.out=1, buffer 110 is disabled. Similarly, when DFF_EnBA.out=0, buffer 115 is enabled, and when DFF_EnBA.out=1, buffer 115 is disabled.

Circuit 100 also includes respective by-pass lines 140 and 145, so that previous signal values A and B, denoted A_Delayed and B_Delayed, respectively, are accessible, together with current signal values A and B.

Circuit 100 includes four logical processing units, 150, 155, 160 and 165. Processing unit 150 is a NAND gate with inputs A and A_Delayed; processing unit 155 is a NAND gate with inputs B and B_Delayed; processing unit 160 is an AND gate with input !DFF_EnBA.out in addition to the output coming from processing unit 150 into processing unit 160; and processing unit 165 is an AND gate with input !DFF_EnAB.out in addition to the output coming from processing unit 155 into processing unit 165.

Circuit 100 includes two pull-up resistors, 170 and 175, which pull the circuit bus up to logical 1 when both sides of the SD or MMC link are not driving signals. It is noted that there is a 2-clock delay for the SD host in circuit 100, since the signal from A→B is delayed one clock count by DFF module 120, and the signal from B→A is also delayed one clock count by DFF module 125.

Figure 2:
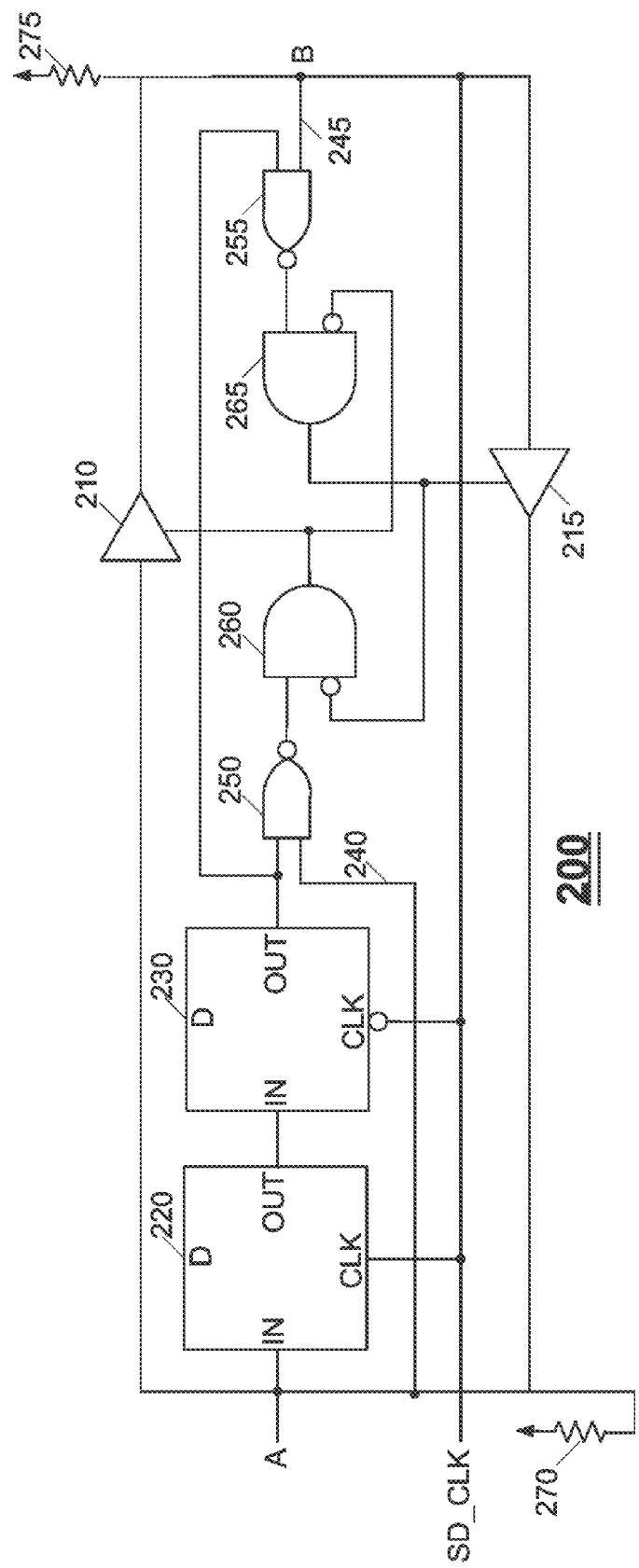
FIG. 2 is a simplified diagram of an electrical circuit that determines bus direction in bi-directional SD and MMC signal lines, in accordance with a second embodiment of the present invention.

Reference is made to FIG. 2, which is a simplified diagram of an alternative electrical circuit 200 that determines bus direction in bi-directional SD and MMC signal lines, in accordance with an embodiment of the present invention. It is noted that there is practically no delay for the SD host in circuit 200. Specifically, DFF module 220 samples the state of the line at a rising edge of the clock SD_CLK, at which time the signal is stable regardless of whether it is driven by A or by B. The signal is delayed by another half clock at DFF module 230, and presented to processing units 250 and 260 at the falling edge of the clock SD_CLK. As such, the signal presented to processing units 250 and 260 is synchronized with signal changes.

Processing unit 250 is a NAND gate with inputs from side A and from the delayed signal from DFF module 230. Processing unit 255 is a NAND gate with inputs from side B and from the delayed signal from DFF module 230. Processing units 260 and 265 are AND gates that respectively control enablement and disablement of buffers 120 and 215.

The logic provides an enable to buffer 210 on side A or to buffer 215 on side B, but never to both. The side that presents a '0' level signal first triggers the logic to open its buffer. If the side A logical level turns to '0', then the logic enables the buffer from A →B. When the buffer from A →B is opened, the signal on side B also switches to '0', but since the enable logic for A →B is already active, it blocks the logic for enabling buffer B →A. The logic remains active until two level '1' bits are received. At that point, the logic blocks the A →B buffer, and the logic is then open to receive a '0' state from either side.

Circuit 200 is of advantage for implementations where host controllers cannot tolerate a delay in receiving an ACK acknowledgement from the slave. Specifically, in some embodiments, after sending a command, the host controller waits for an ACK acknowledgement from the slave. In other embodiments, the host controller waits no longer that a specified maximum tolerance time for the ACK. Circuit 200 ensures that there is no delay. In distinction, the two clock delay inherent with circuit 100 may be more than the host controller can tolerate.

Figure 3:
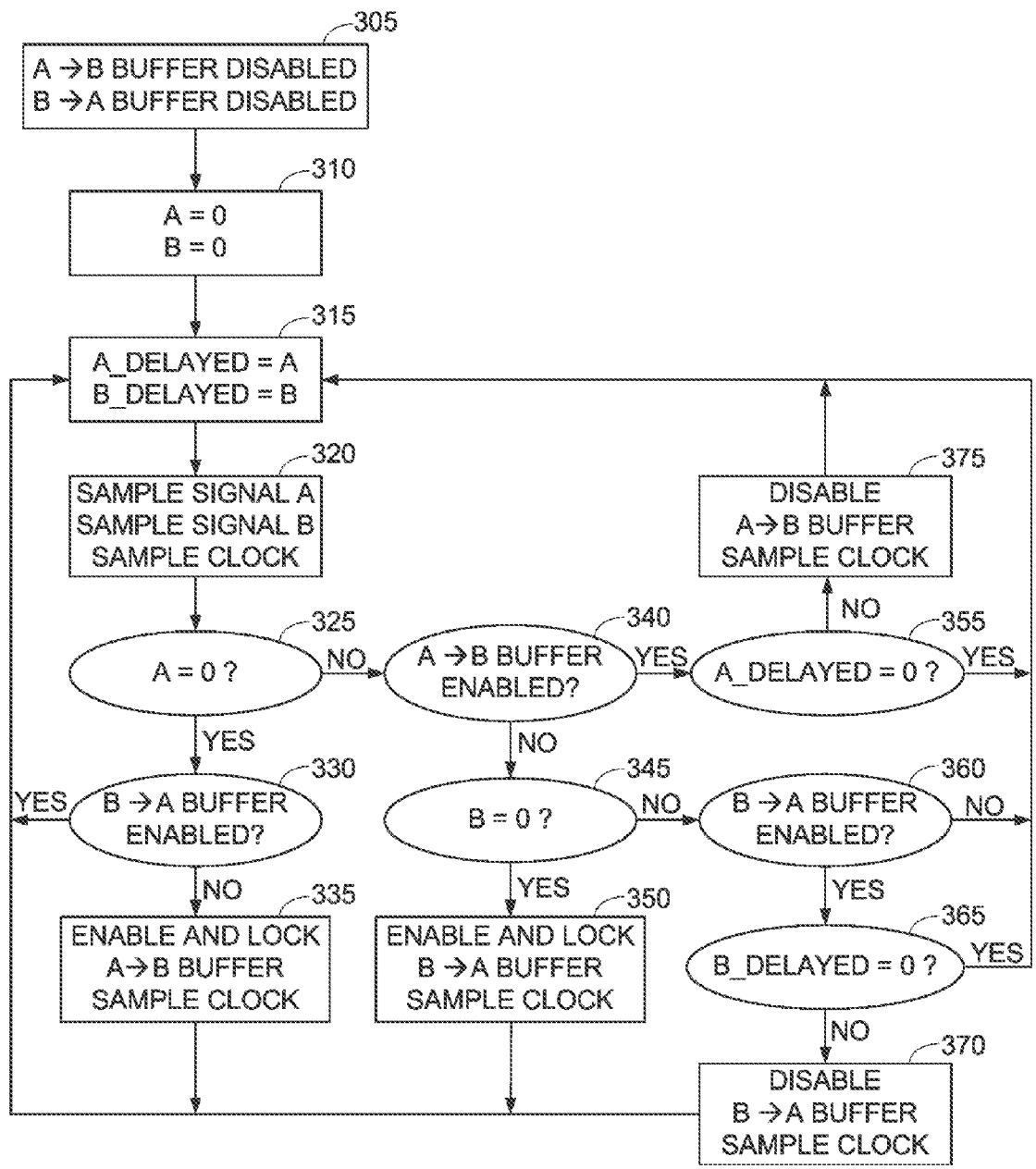
FIG. 3 is a simplified flowchart of a method for determining bus direction in bi-directional SD and MMC signal lines, in accordance with a first embodiment of the present invention.

Reference is made to FIG. 3, which is a simplified flowchart of a method for determining bus direction in bi-directional SD and MMC signal lines, in accordance with a first embodiment of the present invention.

The rationale for the logic illustrated in FIG. 3 is based on three characteristics of SD and MMC buses; namely:

1. The SD and MMC bus D0-D3 and CMD lines have pull-up resistors 170 and 175 connected thereto, which pull the bus up to logical 1 when both sides of the SD or MMC link are not driving signals.
2. Each SD and MMC transaction on the D0-D3 and CMD lines begins with a start bit of logical 0 and ends with a stop bit of logical 1.

3. Since the SD and MMC buses include direction transition, the side driving a signal stops driving a bus 2 clock cycles before the opposite side starts driving the bus.

The logic of FIG. 3 begins at step 305 where both buffers are set to their disabled states. At step 310 the A and B signal values are initialized to logical 0. Steps 315 and 320 are iterative steps that save previous A and B signal values and sample new values.

As seen at steps 325-350, when one side of circuit 100, terminal A or terminal B, is sampled to have a logical 0 input, circuit 100 enables the buffer in the direction from that side to the opposite side, and locks the buffer in the enabled state.

As seen at steps 355-375, circuit 100 disables the enabled buffer when two consecutive logical 1 bits are detected. The event of detecting two consecutive logical 1 bits may represent an end of transaction, or may be part of a transaction. In the former case, both buffers are disabled, and circuit 100 is ready to detect a next transaction, and switch direction as required. In the latter case, the SD or MMC bus remains in its correct logical level due to the pull-up resistors. Since the previous bit was a logical 1, no delay in bus signal stabilization is incurred, due to device and bus capacitance.

In order to avoid potential problems with transient conditions and synchronization to the SD_CLK signal, an embodiment of the present invention includes a sampling mechanism that delays transfer of bits from one direction to the other direction by a single clock, as indicated at steps 320, 335, 350, 370 and 375 of FIG. 3. Such delays are implemented by DFF modules 120, 125, 130 and 135 of FIG. 1, and do not affect proper operation of the SD or MMC bus, since transaction starts are determined by start bits, and not based on exact timing. Internally in a transaction, the delay is fixed and thus no change to transaction content occurs.

The logic of FIG. 3 applies to all bi-directional signals in an SD or MMC bus. However, since the D0-D3 data lines change direction simultaneously, it is only necessary to apply the logic of FIG. 3 to one of these data lines. The buffer enable/disable signals derived for the one data line suffices to control the buffers for the other three data lines. It is noted that even though the data lines may drive different signals, each data communication, from A to B or from B to A, starts with a '0' bit and ends with two consecutive '1' bits.

Figure 4:
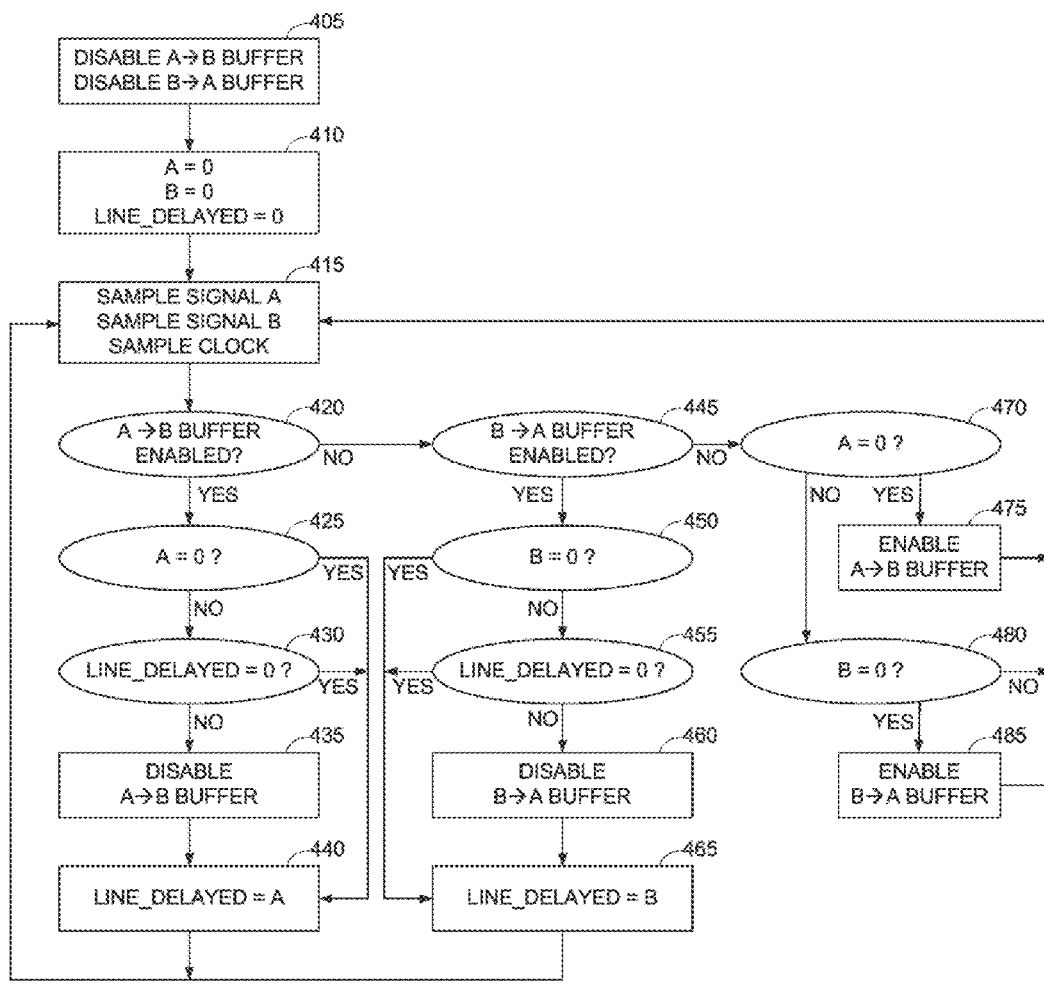
FIG. 4 is a simplified flowchart of a method for determining bus direction in bi-directional SD and MMC signal lines, in accordance with a second embodiment of the present invention.

Reference is made to FIG. 4, which is a simplified flowchart of a method for determining bus direction in bi-directional SD and MMC signal lines, in accordance with a second embodiment of the present invention. At step 405, both buffers A→B and B→A are disabled. At step 410, A, B LINE_DELAYED are initialized to zero. At step 415, A and B are sampled during one clock cycle, which begins a processing loop. The processing loop has three primary branches; a first branch at steps 420-440, which is entered when the A→B buffer is enabled, a second branch at steps 445-465, which is entered when the B→A buffer is enabled, and a third branch at steps 470-485, which is entered when both the A→B buffer and the B→A buffer are disabled.

In the first branch the A→B buffer is enabled. If the current and previous signal values for A are logical '1's, as determined at steps 425 and 430, then the A→B buffer is disabled at step 435. The value of LINE_DELAYED is set to the current A signal value at step 440, and processing returns to step 415.

In the second branch the B→A buffer is enabled. If the current and previous signal values for B are logical '1's, as determined at steps 450 and 455, then the B→A buffer is disabled at step 460. The value of LINE_DELAYED is set to the current B signal value at step 465, and processing returns to step 415.

In the third branch the A→B buffer and the B→A buffer are both disabled. If the current A signal value is logical '0', as determined at step 470, then the A→B buffer is enabled at step 475 and processing returns to step 415. Otherwise, if the current B signal value is '0', as determined at step 480, then the B→A buffer is enabled at step 485, and processing returns to step 415. If neither the current A signal nor the current B signal is logical '0', then both buffers remain disabled.

Reference is made to the Verilog pseudo-code presented hereinbelow, which summarizes one cycle of the logic for enabling and disabling buffers 110 and 115 in circuit 100 of FIG. 1. Logical processing units 150 and 160 are used to evaluate the Boolean expression !(A & A_Delayed) & !DFF_EnBA.out, and logical processing units 155 and 165 are used to evaluate the Boolean expression !(B & B_Delayed) & !DFF_EnAB.out.

```
DFF_A.in = A
DFF_A.clk = SD_CLK
A_Delayed = DFF_A.out
DFF_B.in = B
DFF_B.clk = SD_CLK
B_Delayed = DFF_B.out
BufferAtoB.in = A_Delayed
B = BufferAtoB.out
BufferBtoA.in = B_Delayed
A = BufferBtoA.out
DFF_EnAB.in = ! (A & A_Delayed) & !DFF_EnBA.out
DFF_EnAB.clk = SD_CLK
BufferAtoB.enable = DFF_EnAB.out
DFF_EnBA.in = ! (B & B_Delayed) & !DFF_EnAB.out
DFF_EnBA.clk = SD_CLK
BufferBtoA.enable = DFF_EnBA.out
```

Reference is made to the Verilog pseudo-code presented hereinbelow, which summarizes one cycle of the logic for enabling and disabling buffers 210 and 215 in circuit 200 of FIG. 2. Logical processing units 250 and 260 are used to evaluate the Boolean expression !(A & DFF2_A.out) & !Logic_EnBA, and logical processing units 255 and 265 are used to evaluate the Boolean expression !(B & DFF2_A.out) & !Logic_EnAB.

```
DFF_A.in = A
DFF_A.clk = SD_CLK
DFF2_A.in = DFF_A.out
DFF2_A.clk = !SD_CLK
BufferAtoB.in = A
BufferBtoA.in = B
A = BufferBtoA.out
B = BufferAtoB.out
BufferAtoB.enable = ! (A & DFF2_A.out) & !Logic_EnBA
BufferBtoA.enable = ! (B & DFF2_A.out) & !Logic_EnAB
```

Reference is made to FIG. 5, which is a sample simulation of the method of FIG. 3 for A and B signals 0010101110111 and 0010111, in accordance with an embodiment of the present invention. Each column in FIG. 5 represents one clock cycle. As may be seen in FIG. 5, the signal direction goes from A to B, and Out A is a one clock delay of A, for bits 0010101 and for bits 01. During the time Out A is used, the buffer from A to B is locked (represented by logical 1), and the buffer from B to A is unlocked (represented by logical 0). Signal direction goes from B to A, and Out B is a one clock delay of B, for bits 00101. During the time Out B is used, the buffer from B to A is locked, and the buffer from A to B is unlocked.

It will be appreciated by those skilled in the art that although detection of two logical 1 bits triggers circuit 100 to disable the enabled buffer, as indicated in FIGS. 3-5, detection of three or more logical 1 bits may be used instead to trigger the disabling.

It will further be appreciated by those skilled in the art that circuit 100 may be used as a component of a more complex circuit that selectively connects terminal A with two terminals, B and C, or more than two terminals. To this end, reference is now made to FIG. 6, which is a simplified diagram of an electrical circuit 500 that determines bus direction in multiplexed directional SD and MMC signal lines, in accordance with an embodiment of the present invention. Generally, terminal A is connected to a host device, and terminals B and C are connected to slave devices.

Figure 6:
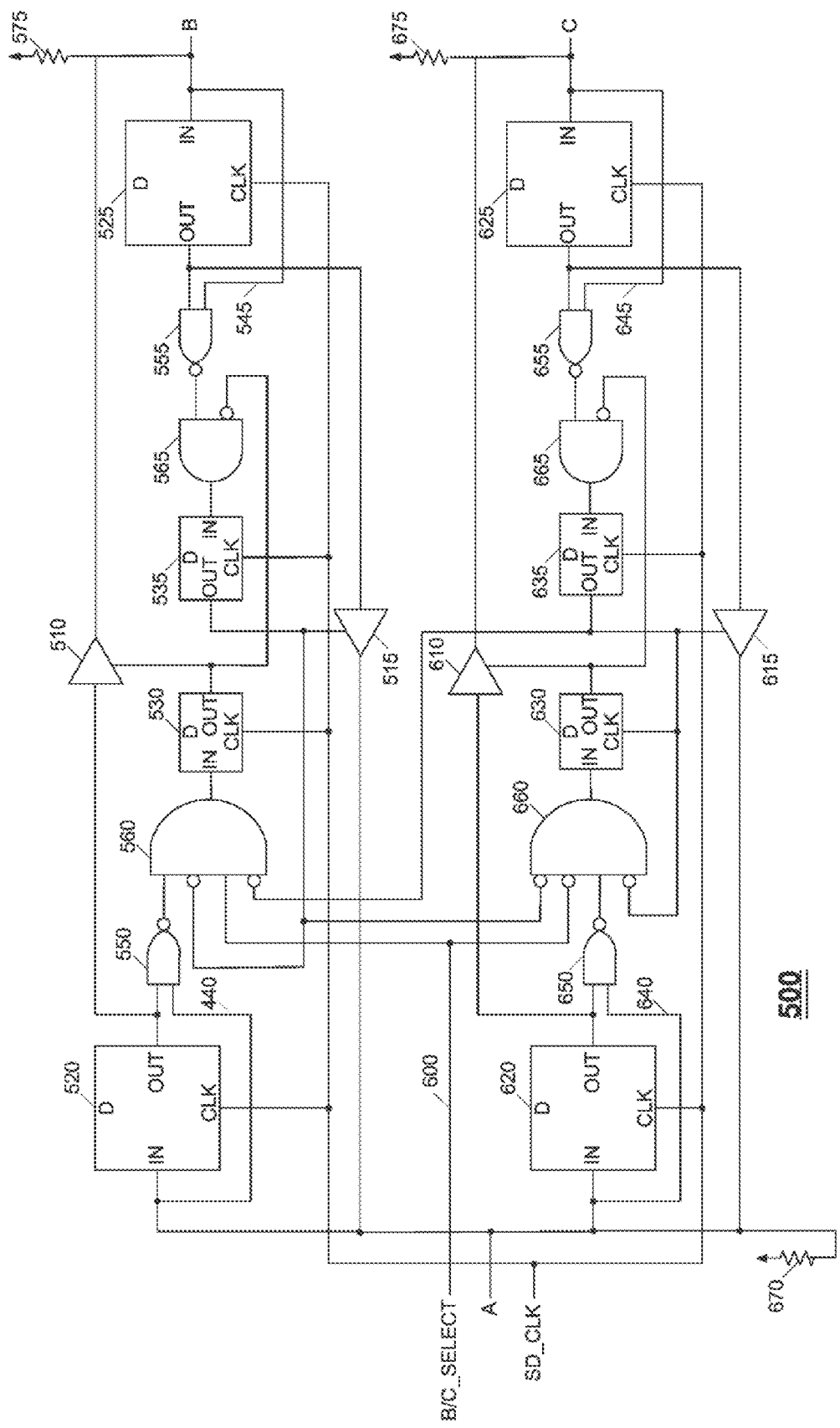
FIG. 6 is a simplified diagram of an electrical circuit that determines bus direction in multiplexed directional SD and MMC signal lines, in accordance with an embodiment of the present invention.

As shown in FIG. 6, circuit 500 includes two sub-circuits, each similar in operation to circuit 100. The elements of one of the sub-circuits are labeled with numerals 510-575, and the corresponding elements of the other sub-circuit are labeled with numerals 610-675. Each of the sub-circuits is bi-directional, with one direction enabled and the other direction disabled, at any moment.

Circuit 500 includes a B/C_SELECT signal line 600, for selecting terminal B or terminal C. B/C_SELECT line 600 originates from a controller for the host device connected to terminal A.

In distinction from logical processing unit 160 of circuit 100, logical processing units 560 and 660 have four input lines. For each logical processing unit, two of its input lines carry signals from the sub-circuit in which the processing unit is located, one signal for examining two previous bits in the enabled direction and the other signal for examining a bit in the disabled direction. One of its input lines carries a signal from the other sub-circuit, for examining a bit in the disabled direction; and one of its input lines carries a signal from B/C_SELECT line 500. Terminals A, B and C may have the same voltage levels, or different voltage levels.

The sub-circuits of circuit 500 shown in FIG. 6 correspond to the circuit 100 of FIG. 1. It will be appreciated by those skilled in the art that the alternative circuit 200 of FIG. 2 may be used instead for the sub-circuits of circuit 700, resulting in an alternate embodiment of circuitry for connecting terminal A with terminals B and C using bi-directional circuits.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A circuit with bi-directional signal transmission, comprising:
    a first signal source, for generating a first signal comprising one bit per clock cycle during a first plurality of clock cycles;
    a second signal source, for generating a second signal comprising one bit per clock cycle during a second plurality of clock cycles;
    a first buffer, coupled with said first signal source, that outputs the first signal when the first buffer is enabled;
    a second buffer, coupled with said second signal source, that outputs the second signal when the second buffer is enabled;
    a plurality of logical gates, coupled with said first signal source, said second signal source, said first buffer and said second buffer, that control enablement of said first buffer and said second buffer, such that (i) at any given clock cycle at least one of said first buffer and said second buffer is disabled, and (ii) when said first buffer and said second buffer are both disabled, subsequent generation of a '0' bit in the first signal or the second signal causes enablement of said first buffer or said second buffer, respectively.

2. The circuit of claim 1 wherein said plurality of logical gates comprises NAND gates and AND gates.

3. The circuit of claim 1 wherein said first buffer and said second buffer are tri-state buffers.

4. The circuit of claim 1 wherein said plurality of gates further control enablement of said first buffer and said second buffer such that (iii) generation of two consecutive "1" bits in the first or second signal causes disablement of said first buffer or said second buffer, respectively, when said first buffer or said second buffer respectively were enabled.

5. The circuit of claim 1 wherein said first signal source is coupled with a host device, and said second signal source is coupled with a slave device.

6. The circuit of claim 5 wherein said host device and said slave devices are SD devices.

7. The circuit of claim 5 wherein said host device and said slave devices are MMC devices.

8. The circuit of claim 1 further comprising first and second pull-up resistors, that are operative to generate logical '1' bits during clock cycles when neither said first signal source nor said second signal source are generating said first and second signals, respectively.

9. A circuit with bi-directional signal transmission, comprising:
    a first signal source, for generating a first signal comprising one bit per clock cycle during a first plurality of clock cycles;
    a second signal source, for generating a second signal comprising one bit per clock cycle during a second plurality of clock cycles;
    a first buffer, coupled with said first signal source, that outputs the first signal when the first buffer is enabled;
    a second buffer, coupled with said second signal source, that outputs the second signal when the second buffer is enabled;
    a plurality of logical gates, coupled with said first signal source, said second signal source, said first buffer and said second buffer, that control enablement of said first buffer and said second buffer, such that there is less than a one clock cycle delay in transmitting the first signal via said first buffer during the first plurality of clock cycles, and in transmitting the second signal via said second buffer during the second plurality of clock cycles.

10. The circuit of claim 9 wherein said first signal source is coupled with a host device, and said second signal source is coupled with a slave device.

11. The circuit of claim 10 wherein said host device and said slave devices are SD devices.

12. The circuit of claim 10 wherein said host device and said slave devices are MMC devices.

* * * * *